United States Patent
Orcutt et al.

[15] 3,671,426
[45] June 20, 1972

[54] CONTINUOUS FILTERING PROCESS

[72] Inventors: John C. Orcutt; Forest O. Mixon, both of Chapel Hill, N.C.

[73] Assignee: Research Triangle Institute, Research Triangle Park, N.C.

[22] Filed: Sept. 1, 1970

[21] Appl. No.: 68,611

[52] U.S. Cl. ................................210/20, 210/33, 210/67
[51] Int. Cl. ...................................................B01d 33/16
[58] Field of Search .............210/20, 30, 33, 75, 289, 195, 210/66, 67

[56] References Cited

UNITED STATES PATENTS

| | | | |
|---|---|---|---|
| 3,435,625 | 4/1969 | Wiegandt | 62/58 |
| 2,703,314 | 3/1955 | Dirnberger | 210/20 X |
| 2,600,085 | 6/1952 | Van Dyk | 210/75 X |

Primary Examiner—Samih N. Zaharna
Attorney—Cushman, Darby & Cushman

[57] ABSTRACT

A continuous process for removing particulate and dissolved impurities from a liquid comprising the steps of injecting a particulate filter medium into a liquid stream to form a slurry, conveying the slurry into the bottom portion of a separation vessel, accumulating the particulate filter material in the form of a porous plug, moving said plug into the upper portion of said separation vessel, pumping the liquid through the lower portions of said plug, removing the liquid from the upper portion of the separation vessel, removing the particulate filter material from the upper end of the separation vessel above the point at which the liquid is discharged and subjecting the removed filter material to a cleansing or regeneration treatment for reuse in the process.

9 Claims, 2 Drawing Figures

LEGEND
------ LIQUID FEED
—·— PRIMARILY SLUDGE
——— PRIMARILY FILTER MEDIUM

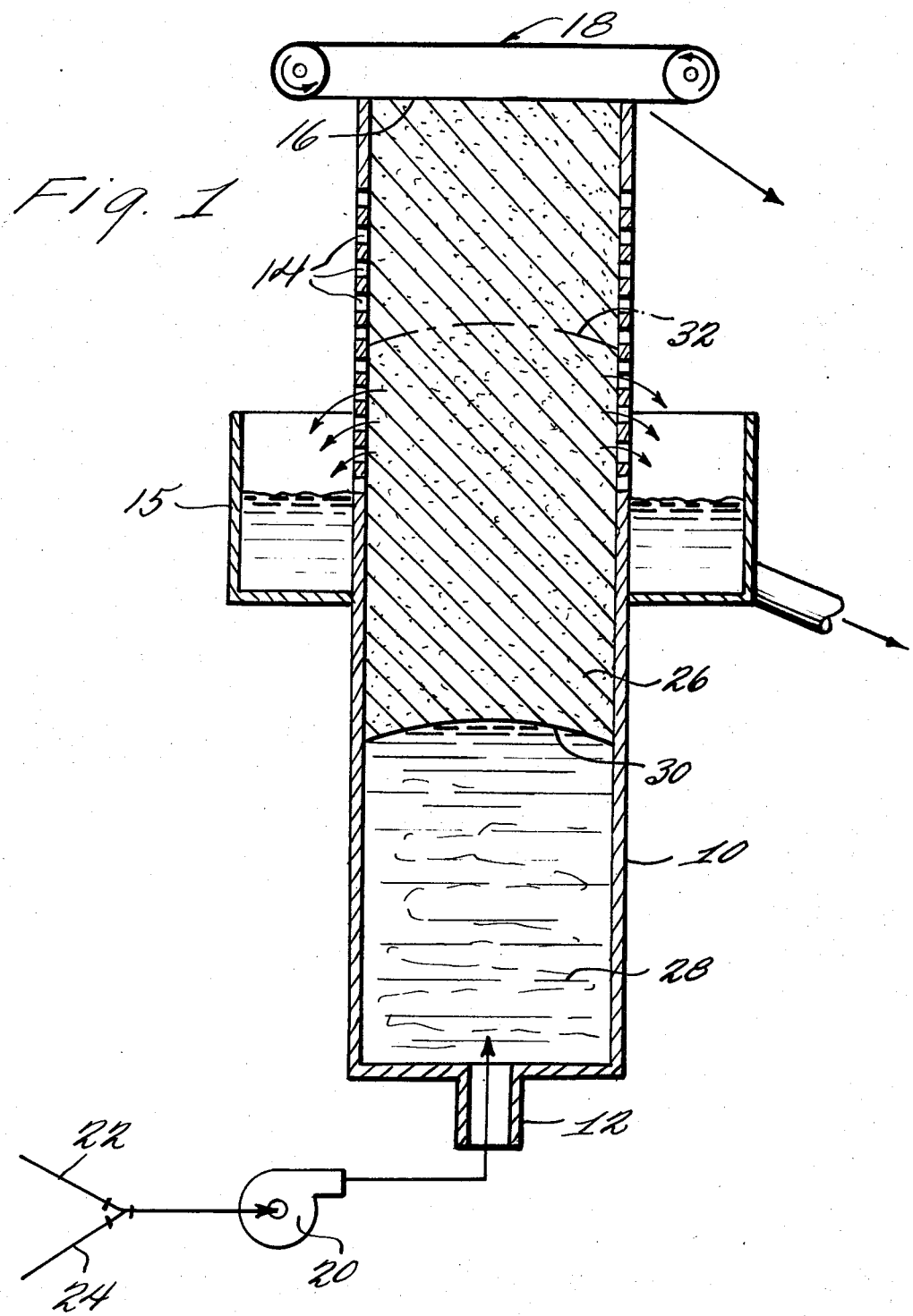

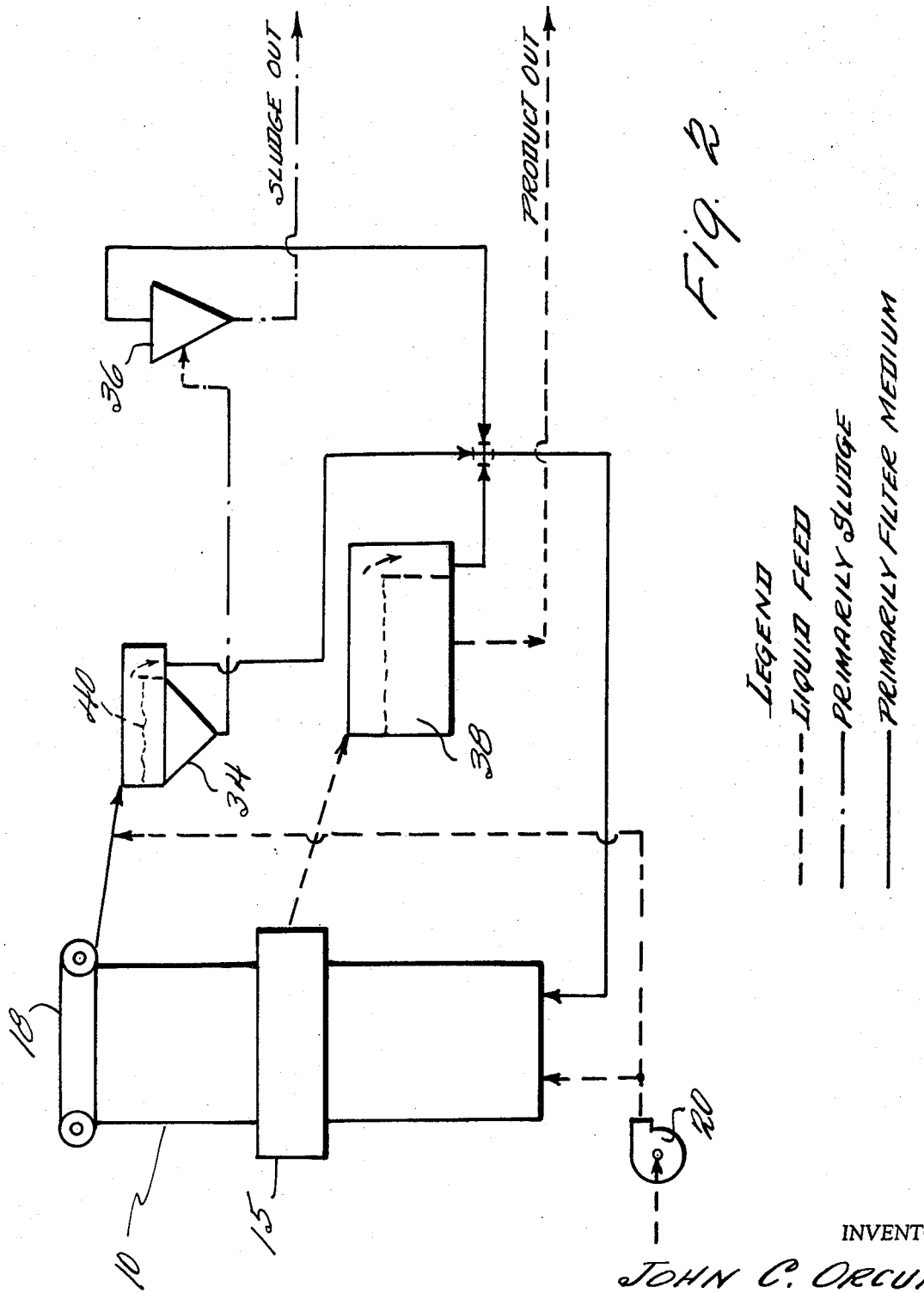

CONTINUOUS FILTERING PROCESS

BACKGROUND OF THE INVENTION

This invention pertains generally to a method of treating liquids and particularly to a filtering process for the purification of water, sewage or other effluents in liquid form.

In practically all major population centers, the problem of water pollution has become so acute that the utilization of efficient as well as economical liquid purification systems has become of critical significance. It has also been recognized that the usefulness of a filtering process should not be limited to treatment of a particular species of liquid waste but, on the contrary, should be readily adaptable to handle the broad range of liquid effluents that are found in densely populated industrial centers. Moreover, industrial and governmental requirements have stressed the importance of employing a filtering process capable of effectively treating large quantities of liquid at operating and maintenance costs low enough to encourage potential users to convert to or adopt such a system.

A number of methods proposed previous to the present invention have suggested a continuous flow-through and separation process wherein a filter medium is mixed in a tank with the liquid to be purified to form a floating filter bed. Separation occurs as the liquid is forced through the bed and is subsequently carried off while impurities are retained in an beneath the filter bed. Such methods require, however, that the process be halted at intervals for the purpose of replacing the used filter medium. It can also be appreciated that as the quantity of flow increases or the concentration of impurities carried or dissolved in the liquid increases, the frequency with which the medium must be replaced or regenerated will correspondingly increase.

Other processes have been put forth wherein a liquid is passed through a bed of particulate material in the form of a packed mass confined in a column. Such processes require that sufficient pressure be supplied to move the filter medium up the column for the purpose of recycling the particulate material. These methods have resulted in large consumptions of power relative to the quantity of liquid treated as well as the use of excessive and often damaging pressures and are, therefore, not ideally suited for liquid treatment systems wherein high capacity output is intended.

Various other methods utilizing a plug of particulate material have necessitated the use of expensive pressure control systems to move the plug as well as the liquid through the treatment zone. Such systems require frequent, if not constant, monitoring in order to forestall the possibility of damage to the system should clogging occur.

It will be seen hereafter that the principal features of the process of the present invention furnish a filtering method capable of application to a facility where the output quantity varies over a broad range and which can economically be carried out over long periods without the loss of effectiveness inherent in the use of processes of the prior art. Furthermore, the process of this invention facilitates control of the filter medium so that the purification ability of the system may be maintained substantially uniform over long periods of use.

SUMMARY OF THE INVENTION

The present invention relates to a process for continuously removing particulate and dissolved impurities from liquids. A solid particulate filter medium is used to remove particulate impurities while an ion exchange or adsorbent medium is used to remove dissolved impurities. It is within the contemplation of the present invention to mix the aforementioned purifying materials together for introduction into a stream of the liquid to be treated or if desired each material may be used in combination with one other medium. The filtering material is introduced into the liquid stream to form a slurry. Thereafter, the slurry is continuously pumped into the bottom portion of a vertical cylinder having a cross-sectional dimension commensurate with the design capacity of the system. The height of the cylinder may be chosen to accommodate the largest volume of filter material required to effect purification. The upper portion of the cylinder may be provided with perforations or a screened section in its lateral wall. Alternatively, conduits having perforated sections may be appropriately disposed inside of the cylinder to establish a liquid discharge means instead of using perforations in the lateral side wall of the cylinder. The filtering material should be selected to have a particle grade size and/or a specific gravity such that at process velocity, filter particles will be conveyed upward in the cylinder. As the slurry rises in the cylinder, the particulate filter medium will accumulate at the surface of the slurry to form a porous, packed aggregate or plug which will rise to fill the cylinder as a result of its own buoyancy as well as a result of the movement of the liquid stream caused by the hydraulic pressure supplied by the slurry pump. The continuing operation of the pump concurrently performs two important functions. First, the liquid is forced upward through the lower portion of the filter plug and outward through the perforations or screen section in the cylinder, thereby causing the liquid to come into intimate contact with the purifying medium. Effective removal of solid particulate and dissolved impurities is readily attained by virtue of such contact. The pressure drop that results from the liquid flow through the plug imparts vertical movement to the plug and aids in overcoming the frictional drag of the walls of the cylinder on the plug. Second, the continuous addition of the slurry to the cylinder furnishes a steady supply of fresh filter medium to the lower portion of the plug while the used filter medium is removed by mechanical means from the top of the cylinder to be washed and/or regenerated for reintroduction into the liquid stream. The size of the plug of filter material can be controlled by varying the pumping rate of the slurry or the rate at which the filter medium is removed from the top of the cylinder.

It will be understood that the amount of pressure required to perform the filtering process does not increase in the course of time since the material usually responsible for clogging the cylinder is being continuously removed.

It will also be seen that the filtering capacity of the porous plug will remain uniform with respect to the purification of a liquid having a measured concentration of impurities. In the event that the concentration of impurities varies, the filtering capacity of the plug may be altered by suitable control of the feed or discharge rates or by adding filter medium having the requisite properties directly to the liquid stream.

Accordingly, it is a principal object of this invention to provide a continuous filtering process for liquids wherein the filtering effectiveness remains substantially constant for a given type of liquid throughout the filtering operation.

Another object of this invention is to provide a filtering method that will accommodate changes in the quantity and properties of the liquid being treated without requiring stoppage of the operation.

A further object is to provide a filtering process that substantially avoids the possibility of stoppage due to clogging of the system.

Still another object is to provide a filtering process wherein the filtering material is continuously regenerated for reuse in the process.

Yet another object of this invention is to provide a filtering process that can be simply adapted to effectively and economically treat a broad range of liquid flow capacities.

Other objects and attendant advantages of the present invention will be readily appreciated when consideration is given to the following detailed description.

BRIEF DESCRIPTION OF THE DRAWINGS

In the drawings:

FIG. 1 is a diagrammatic elevation of one form of apparatus in which the process of the present invention may be carried out; and FIG. 2 is a schematic flow diagram of the process of this invention.

DESCRIPTION OF THE PREFERRED EMBODIMENT

Referring now to the drawings, there is shown in FIG. 1 a separation vessel in the form of a cylinder 10 provided at its lower end with a feed inlet 12. The upper wall of cylinder 10 is formed with a perforated section 14 which functions as a liquid discharge outlet. The size of the perforations should be chosen to be smaller than the particle grade size of the filter medium to prevent passage of the medium therethrough. If desired, the upper wall may consist of a removable screen so that the apparatus may be easily adapted to handle a variety of filter media of different size grades. As noted above, instead of providing perforations in the wall of the cylinder, conduits having perforated portions may be inserted interiorly of the cylinder to establish a liquid discharge. The top 16 of cylinder 10 is open to serve as the discharge outlet for the filter medium. Suitable mechanical means such as motordriven scraper blades, generally indicated at 18, are disposed adjacent open top 16 of cylinder 10 to remove the filter medium as it emerges from the cylinder 10. The filter medium, subsequent to its removal from the cylinder 10, is transported by conventional means away from the cylinder to be subjected to a regenerative cycle as will be hereinafter more fully described. A receptacle 15 is disposed about the exterior wall of cylinder 10 to receive the liquid product passing through perforations 14. Appropriate conduits are connected to receptacle 15 to carry off the liquid product.

Upstream of feed inlet 12, there is provided a slurry pump 20, the outlet of which is connected by suitable conduit means to inlet 12. Proximate the inlet of pump 20, means 22 of conventional design are provided for injection of filter medium into a stream 24 of the liquid to be treated. Appropriate metering means for the filter medium may be disposed at the point of injection to control the proportion of filter medium to liquid used in forming the slurry resulting from the injection of the filter medium. Alternatively, if desired, the filter medium may be introduced directly into the bottom portion of cylinder 10. Such an arrangement may be deemed more suitable from the point of view of economy of operation and may be appreciated as detailed consideration is given to the regeneration cycle.

Turning now to the implementation of the process of the present invention in conjunction with the foregoing described apparatus, the slurry consisting of particulate filter medium and liquid is introduced through pump 20 into the bottom portion of cylinder 10 by way of inlet 12. Due to the fact that the filter medium is conveyed upward by the moving liquid, the filter medium will accumulate at the surface as the slurry rises in the cylinder resulting in the formation of a porous plug. The continued introduction of slurry into the cylinder will both increase the size of the plug and move it up the cylinder. By appropriate control of the pumping rate and the concentration of filter medium in the slurry, the size of the porous can be adjusted so as to occupy the upper portion of the cylinder as illustrated at 26 in FIG. 1. The lower portion of cylinder 10 will contain the slurry 28. As the plug of filter medium emerges from the top 16 of the cylinder 10, it is continuously removed by motor driven scraper blades 18 arranged to operate in a conventional manner. It will be seen that the dimensions of the porous plug 26 may be controlled by adjustment of the speed of the motor operating the scraper blades 18 together with adjustment of the pumping rate of slurry pump 20.

As previously noted, pressure supplied by the pump 20 functions to force liquid through the porous plug 26 while filter medium is continually being added to the plug 26 in the area of the slurry-plug interface 30. By virtue of the amount of pressure supplied, the liquid can be forced to rise through the plug 26 to a level indicated at 32 in FIG. 1. Of course, upon reaching the level of the lowermost perforations 14, some of the liquid will commence flow through these perforations into receptacle 15. As noted above, the discharge of the liquid at a point below the filter medium discharge aids in the prevention of clogging as the pressure drop of the liquid flowing through the plug provides the plug with a vertical lift force.

Purification of the liquid is achieved as the liquid passes through the porous plug which retains any suspended particulate impurities. Incorporation of an ion exchange medium and/or adsorbent material into the slurry and thereby subsequently into the porous plug will effectively operate to remove dissolved impurities from the liquid so that the liquid leaving the cylinder will have been adequately treated for further use.

It will be understood that the filtering or adsorption ability of the system may be altered by adding particulate material of different properties directly by means of the slurry pump without stopping the process. If desired, fresh material may be continuously added in a similar manner to maintain the purification effectiveness of the system substantially constant.

It has been recognized, however, that one of the principal operating expenditures of filtering systems results from the necessity for replacement of used filter medium. Furthermore, the delays that occur in stopping a process to replace the filtering materials also adversely affect the economic efficiency of such processes.

By resorting to the process of the present invention, it will be seen that the stock inventory of filter materials required for the operation of a system can be reduced to a minimum since the present process will permit continuous cleansing, regeneration or reactivation of filter or ion exchange medium or adsorbent material and reintroduction of such recycled medium into the liquid stream.

Referring now to FIG. 2 of the drawings, there is illustrated a schematic flow diagram of the process of this invention showing the recycling steps for the filter medium.

Upon removal of dirty filter medium from the top of the cylinder, the medium is washed by impingement with a stream of water or by a small portion of the liquid fed to the slurry pump 20. The resulting mixture is then fed to a settling tank 34 where the washing is continued and where nearly all of the filter medium will be separated from the denser sludge material as it rises to the surface of the bath 40. The washed medium is then removed by conventional means and fed by suitable conduits to the inlet side of slurry pump 20 or if desired, directly to the bottom portion of cylinder 10 as shown in FIG. 2.

In the event that ion exchange medium or an adsorbent medium is used, suitable reactivation steps may of course be employed subsequent to the washing step.

The sludge containing a small portion of filter medium is then pumped from the bottom of settling tank 34 and may be conveyed to a hydroclone separator 36 where the filter medium will be recovered from the top of the hydroclone 36 to be fed back to the cylinder 10 while the sludge is discharged from the process through the bottom.

It is anticipated that perforated section 14 will be structured as to permit only negligible medium loss. However, if desired, a settling tank 38 may be employed to receive the liquid product fed from receptacle 15 to recover any of the medium that may pass through perforated section 14.

It is to be noted that a principal feature of the recycling process is its continuous nature corresponding to the continuous flow of the liquid being treated. To achieve economical operation of the total process, the volume of filter or ion exchange medium used in the process must be sufficient to correspond with the rate with which the slurry pump is supplied with liquid to be treated. Alternatively expressed, the system should be charged with a quantity of filter and/or ion exchange medium sufficient to enable the recycling process to continuously supply an adequate quantity of filter material to the incoming liquid stream.

The process of the present invention may be easily adapted to treat a broad spectrum of liquid effluents carrying a variety of particulate and dissolved impurities since any desired number of separation vessels may be arranged in sequence each charged with a purification material for removing a specific type of impurity. For example, the initial vessel would be charged solely with a particulate filter medium for removing solid particulate impurities and subsequent vessels would be charged with catalytic and/or adsorbent materials for removing specific dissolved impurities. Each vessel, of course, may be associated with a recycling stage for cleansing or regeneration of its particular purification material.

It should be understood that the foregoing disclosure relates to only a preferred embodiment of the invention and that numerous modifications may be made without departing from the scope of the invention as defined in the appended claims.

We claim:

1. A continuous process for removing particulate and dissolved impurities from a liquid, said process comprising the steps of:

injecting a particulate filter material into a stream of said liquid to form a mixture of said liquid and said particulate filter material in the bottom portion of a separation vessel, accumulating the particulate filter material in the upper portion of said separation vessel to form a porous plug of said particulate filter material through at least a portion of which said liquid is passed, removing said liquid through perforations in the upper portion of said separation vessel, removing filter material from the upper end of said separation vessel at a point above the area of said liquid removal, washing said particulate filter material and separating a major portion of said filter material from the impurities removed from said liquid stream subsequent to the removal of said filter material from the upper end of said separation vessel, and subsequently reinjecting said washed particulate filter material into a stream of said liquid to form a mixture in the bottom portion of said separation vessel.

2. The process of claim 1 wherein said particulate filter material is a particulate ion exchange filter material.

3. The process of claim 1 including the step of introducing a particulate filter material together with an ion exchange filter material into said liquid stream to form a slurry.

4. The process of claim 1 wherein said particulate filter material is an adsorbent filter material.

5. The process of claim 1 wherein said particulate filter material has a specific gravity less than that of said liquid.

6. The process of claim 5 wherein said mixture is pumped under pressure into the bottom portion of said separation vessel.

7. The process of claim 1 including the step of continuously pumping said mixture into the bottom of said separation vessel whereby said plug increases in volume to fill an upper portion of said separation vessel extending upward from a point below said perforations.

8. The process of claim 7 including the step of removing said particulate filter material from the upper end of said separation vessel at a rate whereby the dimensions of said porous plug are maintained substantially uniform.

9. The process of claim 1 including the steps of subjecting the separated impurities to further separation treatment to recover additional filter medium and reintroducing said recovered filter medium into said process.

* * * * *